April 12, 1966 T. E. ALDERDICE 3,245,106
MEAT BALL FORMING MACHINE
Filed April 27, 1964 3 Sheets-Sheet 1

INVENTOR.
THOMAS ALDERDICE
BY *Reuben Spencer*
ATTORNEY

April 12, 1966  T. E. ALDERDICE  3,245,106
MEAT BALL FORMING MACHINE
Filed April 27, 1964  3 Sheets-Sheet 2

INVENTOR.
THOMAS ALDERDICE
BY Reuben Spencer
ATTORNEY

INVENTOR.
THOMAS ALDERDICE
BY Reuben Spencer
ATTORNEY

United States Patent Office 3,245,106
Patented Apr. 12, 1966

3,245,106
MEAT BALL FORMING MACHINE
Thomas E. Alderdice, New Milford, N.J., assignor to AMS Food Processing Equipment Corp., Bronx, N.Y., a corporation of New York
Filed Apr. 27, 1964, Ser. No. 362,650
5 Claims. (Cl. 17—32)

The present invention relates, in general, to food forming apparatus and, in particular, to a machine for forming ground meat into balls, or the like.

It is an object of the present invention to provide a machine of generally simplified construction which will receive ground beef and form the ground beef into balls or mounds which are ready for use.

It is another object of the present invention to provide a machine of the described type which will provide high speed production in a highly efficient manner.

It is a further object of the present invention to provide a machine of the described type which is highly sanitary, the operator never touching the ground beef or the meat balls and the parts of the machine which contact the meat being readily movable for cleaning and sterilization.

It is a still further object of the present invention to provide a machine of the described type having provision to form a plurality of meat balls in a single operation and to simultaneously deliver or eject said plurality of meat balls.

Other and further objects and advantages of the present invention will become readily apparent to one skilled in the art from a consideration of the following specification, taken in connection with the appended drawings which illustrate the best mode presently contemplated for carrying out the invention.

Figure 1:
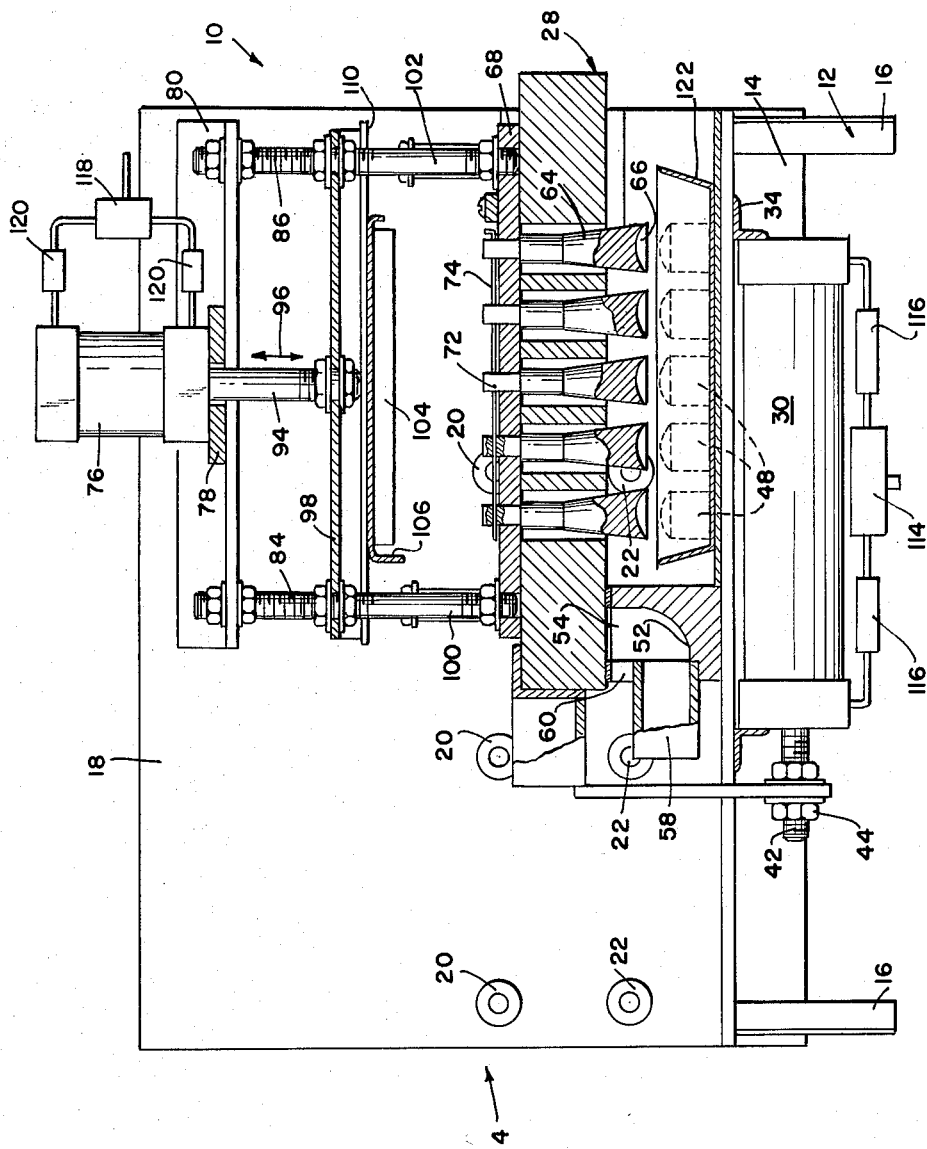
FIGURE 1 is an elevation view of a machine pursuant to the preesnt invention, portions being omitted and broken away for purposes of illustration, and the machine being shown in the meat ball ejecting condition thereof.
Figure 2:
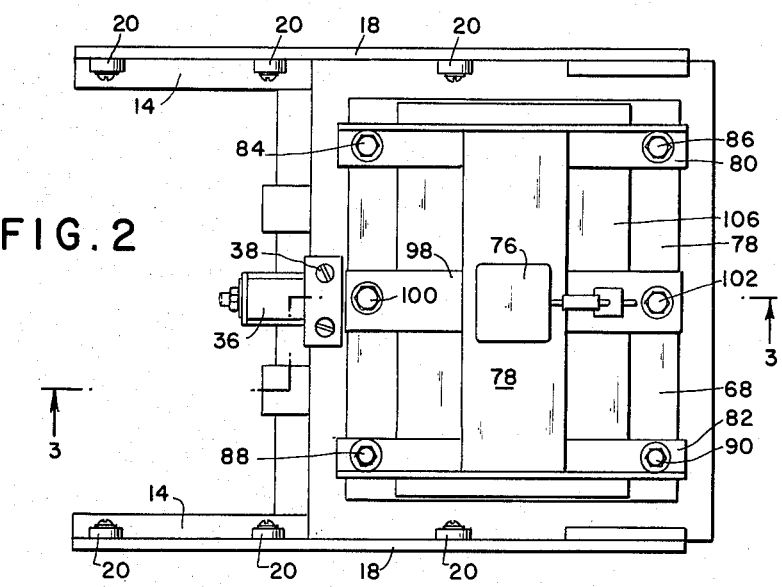
FIGURE 2 is a top plan view of the machine.
Figure 4:
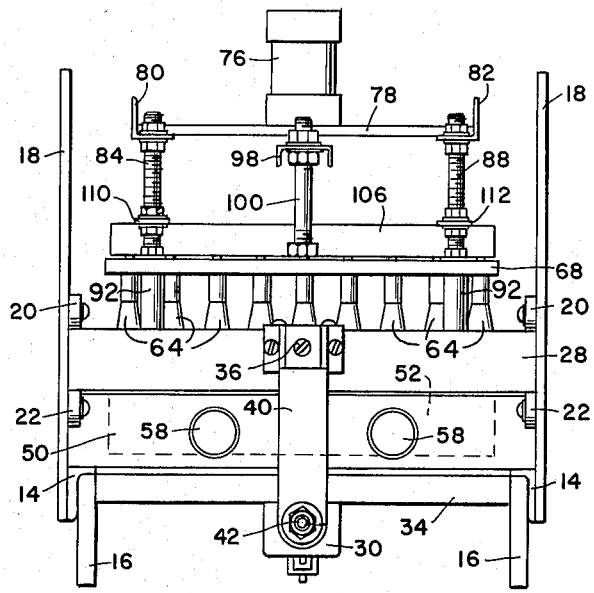
FIGURE 4 is an end view taken in the direction of arrow 4 in FIGURE 1.

Referring now to the drawings in detail, there is shown a meat ball forming machine 10, pursuant to the present invention. The machine is mounted on a bed or support 12 constituted by a pair of horizontal channels 14 each of which mounts two legs 16. The support 12 also mounts a pair of laterally spaced side walls 18—18, each wall being secured to a channel 14. Each side wall is provided in its inner surface with an upper row of three laterally spaced rollers 20 and with a lower row of three laterally spaced rollers 22. In addition, each wall is provided, adjacent its forward marginal edge 24, with a pair of vertically spaced elongated guides 26—26, which are aligned with the upper and lower rows of rollers, respectively, as best shown in FIGURE 3.

Figure 3:
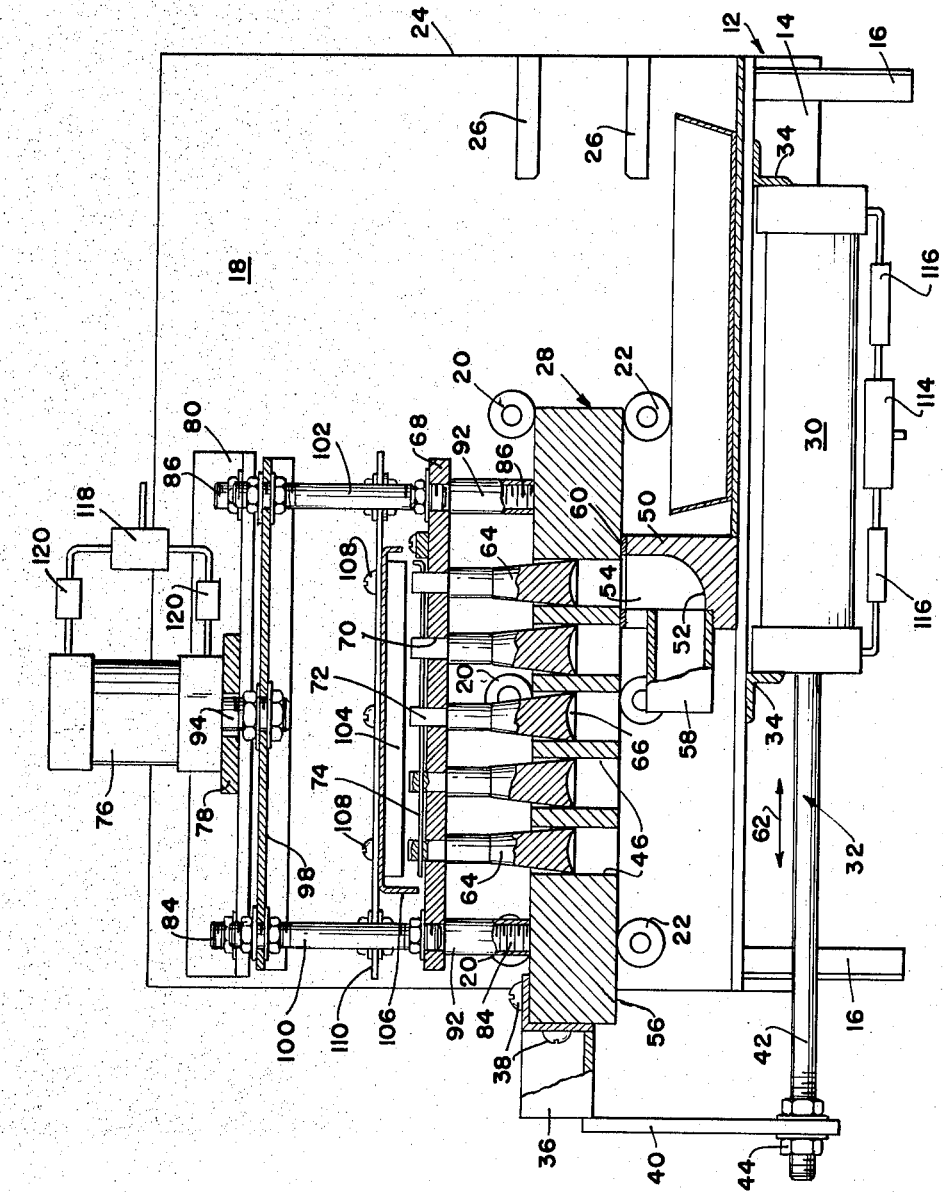
FIGURE 3 is a sectional view on an enlarged scale, taken on line 3—3 of FIGURE 2, the machine being shown in the meat ball forming condition thereof.

A plate 28, preferably formed of aluminum, or other suitable material, is mounted by the rollers 20-22, for movement to and from a projected position thereof, shown in FIGURE 1, and a retracted position thereof, shown in FIGURE 3. Reciprocal movements of plate 28, between said positions thereof, is effected preferably by pneumatic means constituted by an air cylinder 30 having an operative plunger 32.

Air cylinder 30 is mounted by a pair of channels 34—34 which extend between and are mounted by the channels 14—14. The plunger 32 is connected to the movable plate 28 by means of a yoke 36, which is secured to the plate by bolts 38—38, the yoke being provided with a rigid strap 40 through which the threaded end 42 of the plunger extends. The plunger is adjustably secured to the strap by means of nuts 44—44. Consequently, it will be apparent that movement of the plunger into and out of the air cylinder 30 will result in horizontal reciprocation of the plate 28 to and from the positions thereof shown in FIGURES 1 and 3, on the rollers 20—22.

The plate 28 is provided with a predetermined number of bores or apertures 46 which extend therethrough, as best shown in FIGURE 3. Forty-five bores 46 are provided in the illustrated embodiment. However, it will be understood that there may be a greater or smaller number of bores, depending upon the number of meat balls 48 (FIGURE 1) to be produced during each operating cycle of the machine 10. In order to form the meat balls 48, the bores 46 must first be supplied with ground or chopped meat, as hereinafter described in detail.

In order to supply the ground beef to the bores 46, provision is made for a meat feeding bar 50, formed of aluminum or other suitable material. The feeder bar 50 is mounted by the frame members 14 and extends between the side walls 18—18. The feeder bar is provided with an elongated recess 52 which extends longitudinally of the bar and is provided with a top opening 54 which confronts the lower surface 56 of plate 28, as best shown in FIGURES 1 and 3. Provision is made for the meat supply parts 58—58 which communicate with the trough 52. The parts or conduits 58—58 are adapted to be connected to a conventional sausage stuffer which forces a ground meat mixture, under continuous pressure, through the conduits 58—58 into the trough 52.

The lower surface 56 of plate 28 abuts the top surface of the meat feeder bar 50. In order to minimize friction between the abutting surfaces of the plate 28 and meat feeder bar 50, the latter is provided with an anti-friction coating or layer 60 formed of suitable material such as, for example, "Teflon."

In view of the foregoing, it will be apparent that reciprocation of plunger 32, as indicated by arrows 62 (FIG. 3) will result in similar reciprocation of plate 28 relative to the meat filled trough 52. As the bottom surface 56 of the plate 28 rides on the anti-friction layer 60, the rows of bores 46 are positioned successively over the trough 54, as shown in FIGURE 3. During movement of the plate 28 from the projected position thereof shown in FIGURE 1, to the retracted position thereof shown in FIGURE 3, the pressurized ground meat in trough 52 is forced out of its open top 54 into each overlying row of bores 46 as the bores come into registry with the trough. The tight fit between the anti-friction layer 60 and the bottom surface 56 of the plate 28 prevents escape of the meat from the trough except when the bores are in position above the trough.

Provision is made in each bore 46 for a companion piston 64, preferably formed of aluminum, which operates therein to and from the retracted position thereof shown in FIGURE 3 and the projected position thereof shown in FIGURE 1. Each piston is provided with a concave face 66 which faces downwardly and extends substantially across the entire diameter of the bore to fill the latter. Each concave face closes the bore and provides a stop for the ground meat forced into the associated bore. It will be apparent that the distance between each face 66 and trough 52 will determine the size of the resulting meat ball 48.

In order to effect vertical reciprocation of the pistons between the projected positions thereof and the retracted positions thereof, the pistons are mounted by a piston carrier 68. As here shown, the carrier 68 is a flat plate provided with bores 70, equal in number to the number of pistons. Each piston has a reduced neck 72 which extends through an associated bore 70. The piston necks are apertured and an elongated pin 74 extends, as best shown in FIGURES 1 and 3, through each row of five piston necks. It will be apparent that each row of five pistons may be readily released from plate 28 by merely withdrawing the associated pin 74 therefrom.

Carrier 68 is mounted for vertical reciprocation to and from its raised or retracted position, as shown in FIGURE 3, and its lowered or projected position, as shown in FIGURE 1. Said vertical reciprocation of the carrier plate is effected by air cylinder 76. As here shown, cylinder 76 is mounted on a slat 78 which is mounted by the laterally spaced channels 80–82. The channels 80–82 are mounted by four rods 84, 86, 88 and 90 which are carried by plate 28. The four rods extend through the carrier plate 68 which is free to move relative thereto and which is guided thereby. For this purpose, each rod is provided with a collar 92.

Air cylinder 76 is provided with a plunger 94 which is vertically reciprocated thereby, as indicated by arrows 96. Plunger 94 mounts a channel 98. A pair of rods 100 and 102 interconnect the channel 98 and the piston carrier 68, whereby the cylinder 76 is operable to vertically reciprocate the carrier 68.

Provision is made also for an electric heating element 104, the function of which will presently appear. The heating element is mounted in a reflector box 106, which is secured, as 108, to a pair of slats 110–112. Slat 110 is mounted by rods 84–86, and slat 112 is mounted by rods 88–90. It will be noted that in the raised position of the pistons 64, the necks 72 thereof extend into the heating chamber 106 to heat the pistons so as to prevent meat from sticking to the concave faces thereof.

The operation of the air cylinder 30 is controlled by a directional valve 114 and a pair of speed control valves 116—116. Similarly, the operation of air cylinder 76 is controlled by a directional control valve 118 and a pair of speed control valves 120—120. It will be understood that said valves are of conventional construction, operable by conventional circuitry.

The operation of the meat forming machine 10 will now be described. As previously indicated, a conventional sausage stuffer is connected to inlet parts 58 to supply ground beef under pressure to the reservoir 52 from which the meat cannot escape unless the cylinders or bores 46 overlie the reservoir. Assuming the machine is now in the position thereof illustrated in FIGURE 1, a meat ball tray 122 is mounted on frame 12 in the position illustrated. Directional control valve 118 is operated to actuate air cylinder 76 to raise the carrier 68 to withdraw pistons 64 into cylinders 46, as shown in FIGURE 3. The pistons are disposed, at their necks 72, within heat box 106 so as to be heated thereby. Control valve 114 is operated to actuate air cylinder 30 to move carriage 28 from the position thereof shown in FIGURE 1 to the position thereof shown in FIGURE 3. As the cylinders 46 move over reservoir 52, the ground meat is forced into each cylinder so as to fill the latter up to the concave face 66 of the associated piston. After the carriage 28 has reached its position shown in FIGURE 3, valve 114 is operated so as to actuate cylinder 30 to return the carriage to its delivery position shown in FIGURE 1. Control valve 118 is now operated to actuate cylinder 76 so as to move plunger 94 downwardly.

This causes carrier 68 to drop downwardly and strike carriage 28 with a considerable degree of force. At this point, the carriage is disposed between horizontal guides 26 to take up the shock so as to prevent injury to the rollers. However, the downwardly directed force and the resulting shock causes the meat balls 48, formed in the various cylinders 46, to drop downwardly into the underlying tray 122. The heated pistons prevent the meat balls from sticking in the cylinders. The filled tray is then replaced by an empty tray and the cycle is repeated.

The machine 10 may be readily disassembled for cleaning. The pistons 64 may be readily removed by withdrawing the pins 74. The carriage 28 may be removed from yoke 36 by withdrawing bolts 38. It can also be readily removed from rods 84, 86, 88 and 90. The machine 10 may also be made completely automatic in operation, by using a suitable control circuit to provide timed operations of the pneumatic cylinders 30 and 76.

While there has been illustrated and described the presently preferred embodiment of my invention, it will be understood that various changes and modifications may be made therein without, however, departing from the basic inventive concept thereof, as set forth in the appended claims.

I claim:
1. A meat ball forming machine comprising a horizontal reciprocating plate with a plurality of vertically disposed openings extending therethrough forming open end molds for receiving meat therein, a vertical reciprocating piston disposed in each of said molds forming a closure for one end of the mold, an elongated meat feeding bar with a vertical opening disposed at one side of said plate for forcing meat therethrough into said molds, said pistons forming stops for determining the quantity of meat disposed in the molds, means for horizontally reciprocating said mold plate to a discharge station disposed in spaced relationship with said meat feeding bar, a common carrier plate mounting said pistons, and means for vertically reciprocating said carrier plate and pistons for discharging meat from said molds.

2. The machine of claim 1 wherein pneumatic means are provided to reciprocate said mold plate and said carrier plate and pistons.

3. The machine of claim 1 wherein guide means are provided which straddle said mold plate and support said mold plate at its discharge station.

4. The machine of claim 1 wherein heating means are provided to heat said molds.

5. The machine of claim 1 wherein said carrier plate reciprocating means is disposed to discharge meat simultaneously from all said molds.

References Cited by the Examiner
UNITED STATES PATENTS

| | | | |
|---|---|---|---|
| 994,714 | 6/1911 | Boyle | 17—32 |
| 2,366,379 | 1/1945 | Bemis | 17—32 X |
| 2,683,284 | 7/1954 | Anderson | 17—32 |
| 2,708,287 | 5/1955 | Long et al. | 17—32 |
| 2,897,745 | 8/1959 | Nichols et al. | 99—109 |
| 3,096,540 | 7/1963 | Miller et al. | 17—32 |

SAMUEL KOREN, *Primary Examiner.*

LUCIE H. LAUDENSLAGER, *Examiner.*